Jan. 4, 1955  A. M. LARSEN  2,698,494
FISH LURE
Filed May 26, 1952
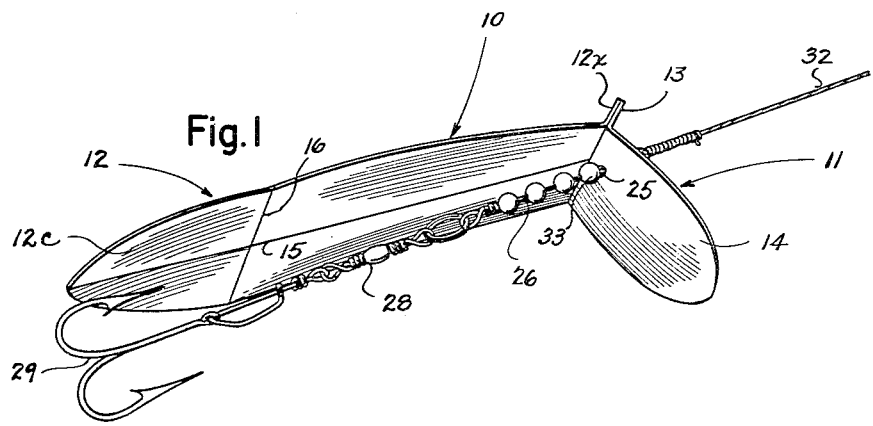
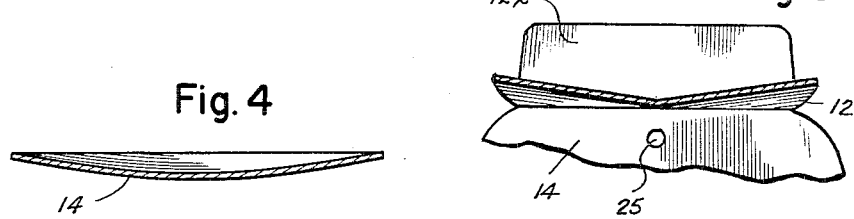
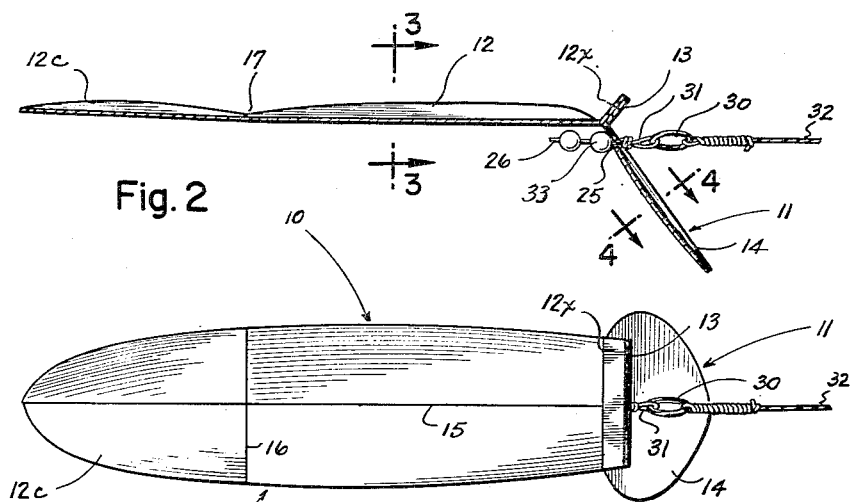
INVENTOR.
Albert M. Larsen
BY
Cook + Robinson
ATTORNEYS

United States Patent Office 2,698,494
Patented Jan. 4, 1955

2,698,494

FISH LURE

Albert M. Larsen, Seattle, Wash.

Application May 26, 1952, Serial No. 289,938

7 Claims. (Cl. 43—42.36)

This invention relates to fish lures and has reference more particularly to a fish lure of the type commonly used both by commercial and sport fishermen in trolling for salmon and like fish.

It is the principal object of this invention to provide a fish lure which is so formed and constructed that when drawn through the water it has an action that is characteristic of a fishing plug and the flashing or brilliant, fish-attracting qualities of a lure made in the form of a trolling spoon.

Another object of this invention is to provide a fish lure made from one or more pieces of polished metal, which has the action of a plug and the attracting qualities of a spoon by reason of its being curved and angularly bent along the specific lines that causes it, when drawn through the water, to substantially simulate the action of a swimming fish.

A further object of this invention is to provide a fish lure having the action of a plug and the attracting features of a spoon, and which has a special feature of construction that prevents its rotating when drawn through the water.

Still another object of this invention is to provide a fish lure equipped with means for its attachment to a line in a manner whereby the pull exerted by a hooked fish will be transmitted directly to the line and not sustained by or through the lure.

Another object of the invention resides in the details of construction of the device and in the specific shape and relationship of its parts, as will hereinafter be fully described.

In accomplishing the above stated and other objects of the invention, I have provided the improved details of construction, the preferred forms of which are illustrated in the accompanying drawings, wherein—

Fig. 1 is a perspective view of a fish lure embodying the novel features of the present invention therein.

Fig. 2 is a central, longitudinal section of the lure.

Fig. 3 is an enlarged cross-section of the lure, taken on line 3—3 in Fig. 2.

Fig. 4 is an enlarged cross-section taken on the line 4—4 in Fig. 2.

Fig. 5 is a plan or top view of the lure.

Referring more in detail to the drawings:

The fish lure embodying the novel feature of my invention is designated in its entirety in Figs. 1 and 5 by reference numeral 10. Preferably it is made from one or more pieces of polished sheet material, such as brass or copper, that are cut and bent to specific shapes. In its finished form, the lure is a one-piece, substantially rigid unit comprising a head or forward end portion 11 and an elongated body portion 12.

The head portion 11 comprises two parts, viz., an upper part or flange 13 and a lower or bottom part or plate 14; these parts being integral and angularly related one to the other as best shown in Fig. 2.

In the present construction, the body portion of the lure, designated generally by numeral 12, comprises a single piece of sheet metal, of an elongated oval or cigar form, as seen best in Fig. 5. It terminates at its forward end in a transverse flange 12x, that slopes forwardly and upwardly at approximately a 45° angle. The flange 12x has a straight top edge, and the flange is registered with and secured by solder or welding to the flange 13 of the head portion 11 which is of the same size. The body 12 also is slightly troughed in its longitudinal direction and to its full length, providing that the metal at opposite sides of its central longitudinal line, designated at 15 in Fig. 5, are upwardly and laterally sloped as is well shown in Fig. 3. At about two-thirds the distance from the flange 12x to the rear end of the body, the metal of the body is somewhat flattened along a transverse line 16, however, the troughing effect continues to the rear end of the body. The flattening of the metal along the transverse line 16 sets off a tail portion for the body, this being designated by reference numeral 12c. This tail portion is upwardly sloped, from the transverse line 16 toward the rear end, at a slight angle relative to the bottom of the trough as formed in the forward end portion of the body. In side view, the upwardly sloping opposite side portions of the forward portion of the body and of the tail portion, present the scalloped outline as noted in Fig. 2, leaving a shallow recess between scallops as designated at 17 in Fig. 2.

The head portion 11 of the lure is rigid relative to the body and is made from a single piece of metal having an angular head along a horizontal transverse line thus setting off the upper and lower portions 13 and 14; these portions being at an angle of about 105° relative to each other, with the angle facing forwardly.

Since the part 13 of the head is disposed flatly against the body flange 12x and secured thereto, the bottom portion 14 is caused to extend downwardly and forwardly at about an angle of 125° relative to the body portion 12 in reference to the showing in Fig. 2. The opposite side edges of the lower part 14 of the head portion are outwardly and downwardly curved from the flange 13 and are then curved toward each other to provide this part with a blunt lower end point as best shown in Fig. 1. The part 14 is concave both transversely and vertically, as shown in Figs. 2 and 4, to provide a forwardly facing spoon-shaped portion. The relationship of this spoon-shaped portion to the body 12 is well shown in Figs. 3 and 5.

The lateral upward slope of the opposite side portions of the main body portion and the upwardly inclined angle of the rearward or tail portion relative to the forward portion are of substantial importance in obtaining the desired action of the fish lure. The angular relationship of the forward and rearward parts of the body is relatively slight and the purpose thereof is to substantially eliminate erratic swerving or dodging back and forth of the lure and effect a relatively controlled action that simulates the action of a small, swimming fish.

A hole 25 is provided in the downwardly directed head portion 14, near its juncture with the body for the passage of a length of beaded wire 26 therethrough as illustrated in Fig. 3. Attached to the rear end of this wire, in the usual manner through mediacy of a swivel 28, are hooks 29. A ring 30 applied to a loop 31 is applied to a loop 31 and the forward end of the wire provides means for securing the wire to a fish line 32. The looped forward end of the wire, and the adjacent bead 33, which is fixed on the wire, are slightly larger than the hole 15 so that the wire cannot be drawn upwardly through the hole 15, nor can it be drawn rearwardly through the hole. Thus the fish lure while retained at a relatively fixed position on the wire, has freedom of action in the water. When a fish strikes, the pull is directly on the wire and fish line and no stress or pull is exerted upon the fish lure.

As shown and described, the lure possesses the advantageous features of a fish plug and in addition thereto has the attracting feature of a bright and shiny surfaced lure similar to a commonly employed trolling spoon. My novel fish lure may be made in varying sizes and from any relatively rigid, polished, or brilliant material.

In its present preferred form the lure is made in dimensions as follows: The body plate is 4½" long, with the tail constituting 1½" of this length. This plate is 1¼" wide at a point half way between its ends and 1" wide at its forward end. The spoon shaped plate is 1½" long and 1½" wide, and the flange 13 is ¼" high and 1" across. The opposite sides of the body, by reason of the troughing, form an angle of about 160°, as seen in Fig. 3.

Having thus described my invention, what I claim as new therein, and desire to secure by Letters Patent, is:

1. A fish lure of the character described comprising an elongated body portion and a head portion rigidly joined to said body portion at the forward end thereof, said body portion terminating at its rearward end in an upwardly inclined tail portion, said head portion having an angular bend therein thereby forming an upper flange and a lower plate and the head portion being joined to the body portion at the juncture of the bend, said lower plate extending forwardly and downwardly and said upper flange extending forwardly and upwardly from the forward end of the body portion.

2. A fish lure as recited in claim 1 wherein the body portion is slightly troughed in its longitudinal direction and said downwardly and forwardly directed plate of the head portion is spoon shaped.

3. A fish lure as recited in claim 1 wherein the body portion is slightly troughed throughout its length, providing flat, upwardly sloping parts at opposite sides of the central line of the body, and is flattened along a transverse line to set off the tail portion.

4. A fish lure as recited in claim 1 wherein the body portion is substantially cigar shaped in plan and said downwardly and forwardly directed plate of the head portions is spoon shaped and forwardly faced, and is of greater width than the body, and is formed in its center line and near the juncture with the body portion, with a hole, and wherein a wire is passed through the hole and secured therein to the plate and is equipped for the attachment of hooks thereto at its rear end, and for attachment of a line at its forward end.

5. A fish lure as recited in claim 1 wherein the body portion is slightly troughed and is substantially cigar shaped in plan, and said tail portion thereof comprises approximately one-third of the length of the body portion.

6. A fish lure as recited in claim 1 wherein the body portion is cigar shaped in plan and is slightly troughed throughout its length, and said tail portion thereof comprises approximately two-fifths the length of the body portion, and wherein the downwardly and forwardly directed plate of the head portion is spoon shaped, of greater width than the body portion and has a length about one-third that of the body portion.

7. A fish lure as recited in claim 6 wherein the spoon shaped plate of the head portion extends at approximately a sixty degree angle relative to the extended center line of the body portion.

References Cited in the file of this patent

UNITED STATES PATENTS

| Number | Name | Date |
|---|---|---|
| 1,852,620 | Martin | Apr. 5, 1932 |
| 1,981,029 | Byus | Nov. 30, 1934 |
| 2,058,121 | Allen | Oct. 20, 1936 |
| 2,254,981 | Sisco | Sept. 2, 1941 |
| 2,375,290 | Docteur | May 8, 1945 |
| 2,557,599 | Dunmire | June 19, 1951 |